(Model.)

J. P. SMITH.
TACKING MACHINE.

No. 445,322. Patented Jan. 27, 1891.

4 Sheets—Sheet 4.

Witnesses:
Henry Hunt Letteney.
Ralph W. E. Hopper.

Inventor.
John P. Smith

United States Patent Office.

JOHN P. SMITH, OF EXETER, NEW HAMPSHIRE, ASSIGNOR TO FRANK M. STEVENS AND HENRY CUNNINGHAM, BOTH OF BOSTON, MASSACHUSETTS.

TACKING-MACHINE.

SPECIFICATION forming part of Letters Patent No. 445,322, dated January 27, 1891.

Application filed November 10, 1890. Serial No. 370,922. (No model.)

*To all whom it may concern:*

Be it known that I, JOHN P. SMITH, of Exeter, in the county of Rockingham and State of New Hampshire, have invented a new and useful Improvement in Tacking-Machines, which will, in connection with the accompanying drawings, be hereinafter fully described, and specifically defined in the appended claims.

Figure 1:
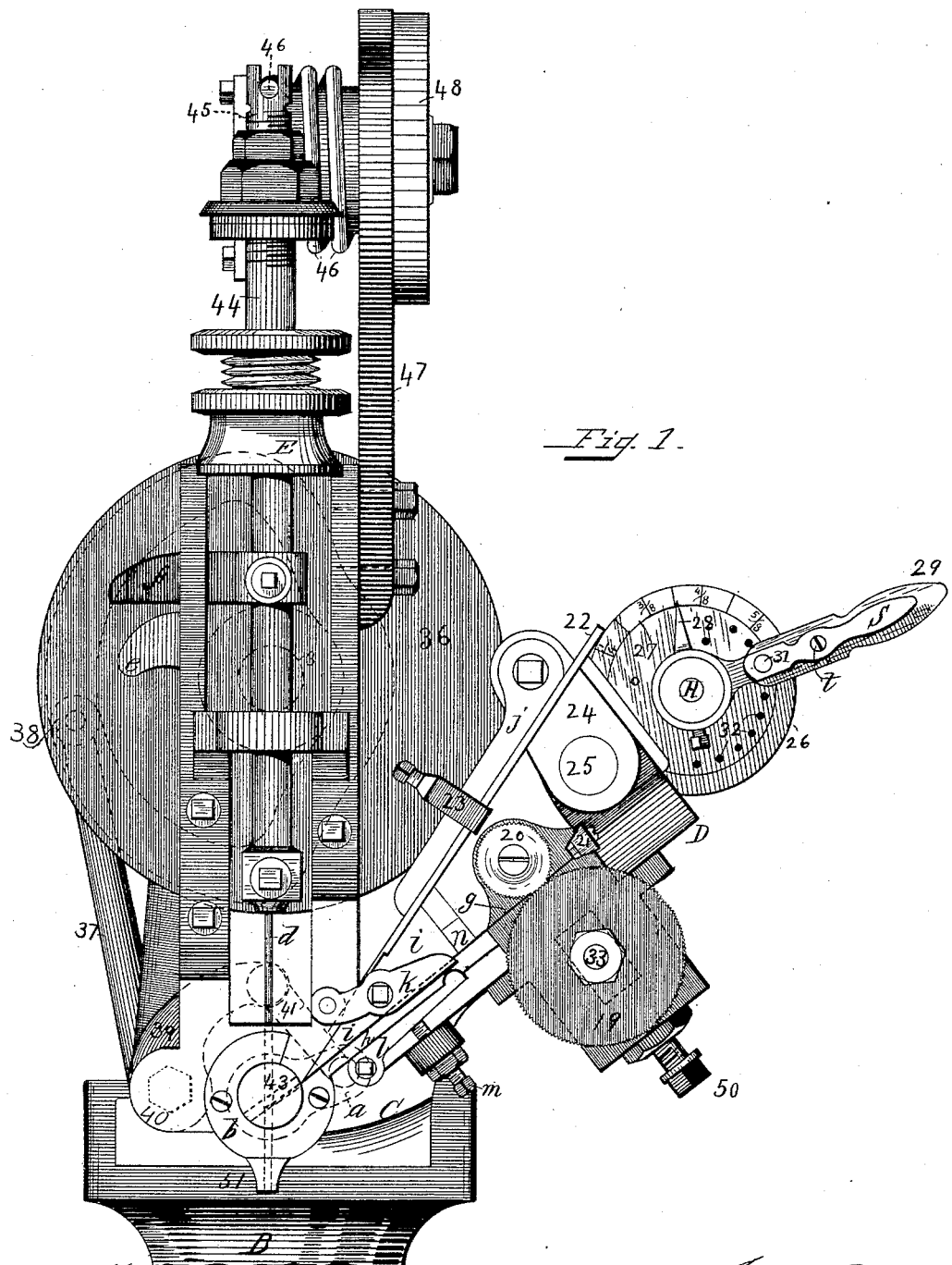
Figure 2:
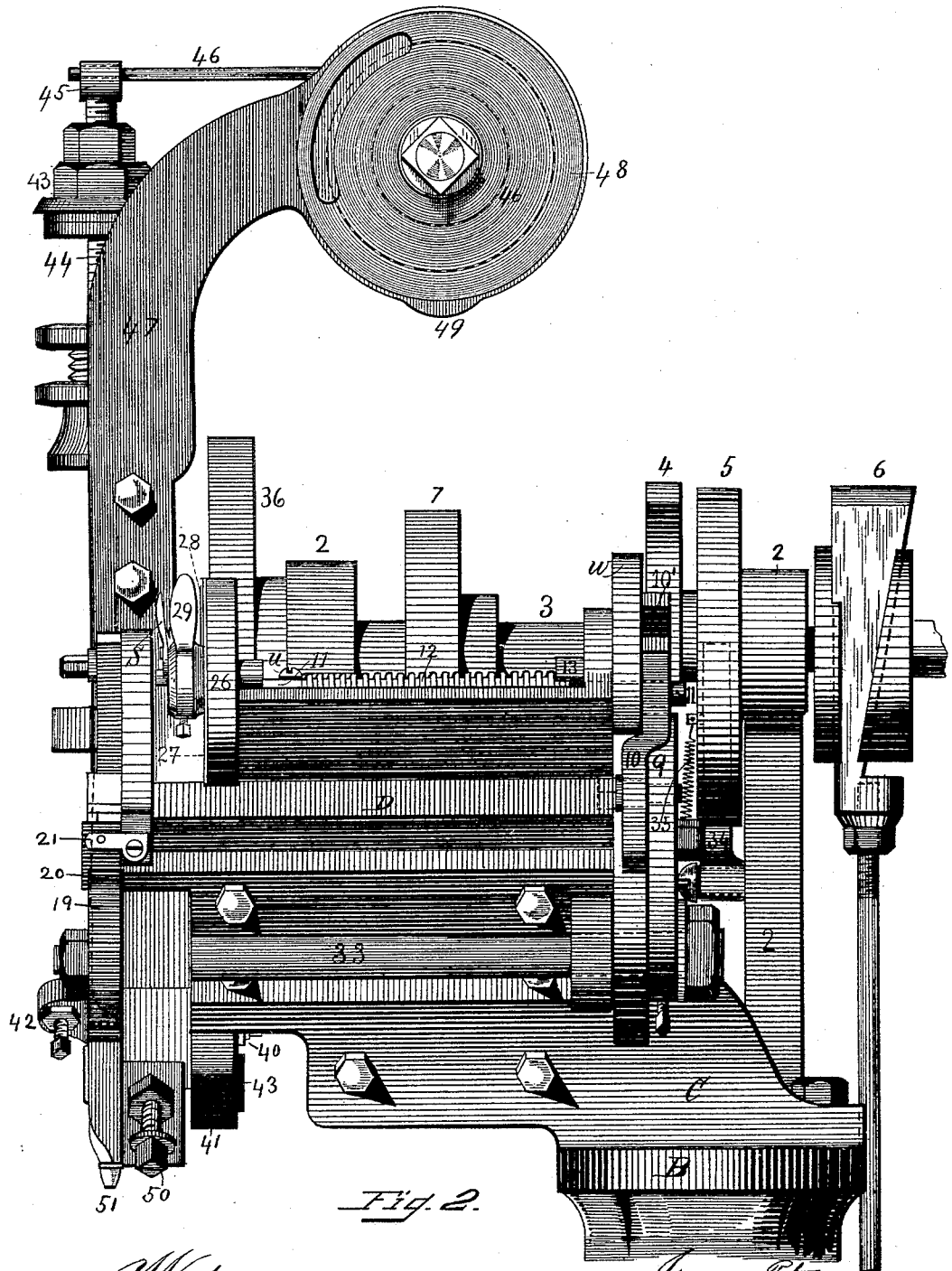
Figure 3:
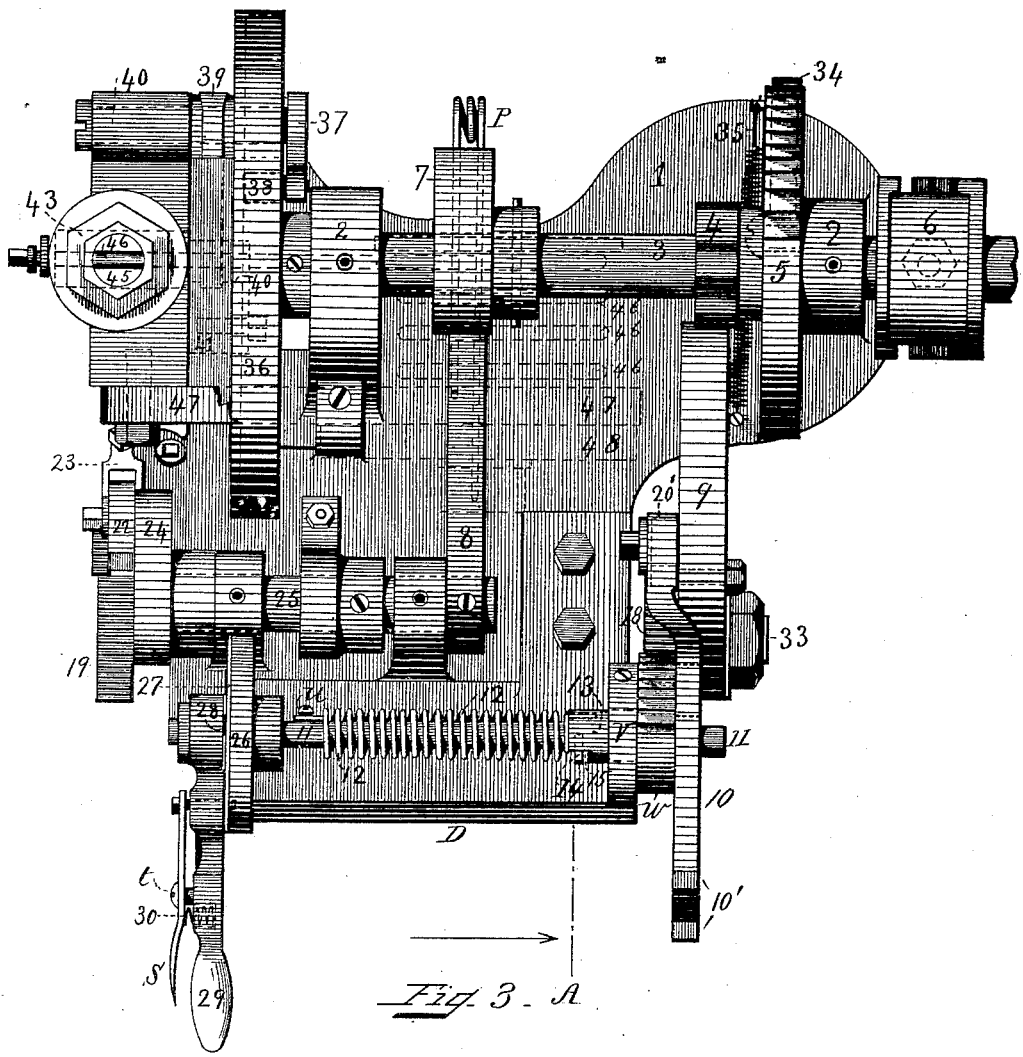
Figure 4:
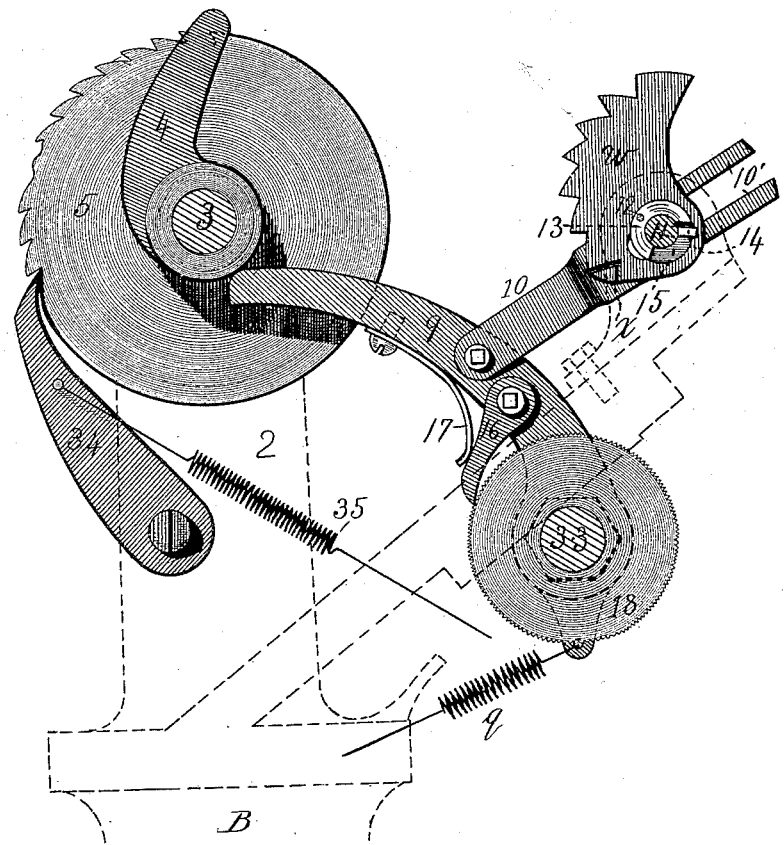

In said drawings, Figure 1 is a front elevation of a machine embodying my improvements, the supporting-pillar being shown only at the top portion thereof. Fig. 2 is an elevation taken at the right-hand side as viewed in Fig. 1. Fig. 3 is a top plan view. Fig. 4 is a detached sectional elevation, the section being taken as on line A, Fig. 3, and the view as from the left therein.

This invention relates to tacking-machines of the kind described in United States Letters Patent No. 376,114, dated January 10, 1888, issued to myself and Warren C. Evans; and it consists in devices and the combinations thereof whereby the downward pressure upon the wire-cutter is controlled by elastic pressure, and devices by which the length of the nail as cut from the wire may be varied at will without stopping the machine, and so that the succeeding nail after such adjustment shall be of the new length required.

Referring again to said drawings, B represents the head portion of the supporting-standard, on which is secured the frame C of the head, in the bearings 2 2 of which the driving-arbor 3 is journaled, the same being driven by a pulley and clutch arranged upon the rear end, (the right-hand end in Fig. 2,) not shown, but as shown in my said former patents, or any desired kind of friction-clutch. On the front end of said shaft is secured the cam-disk 36, in the groove wherein (shown by dotted lines) the trundle or roll 38 travels, thereby actuating its supporting-arm 37, which is pivoted at 40 and is secured to and actuates short arm 39, which, by connector 41, actuates arm $a$, secured upon rocking nail-carrier 43, that moves in its support $b$. The nail-driver $d$ is secured in driver-bar 44, mounted in upright portion E of frame C, said bar being raised by cam $e$ on driving-shaft 3, which engages block $f$ on rod 44, the bar being forced downward to deliver the blow upon the nail by spring 46, the free arm of which bears in the forked head 45 of the bar, the coil of said spring being arranged upon a hub connected with a stress-governing disk 48, mounted upon standard 47, secured upon upright E of the frame. The nail-supplying wire $g$ is fed forward through guide 21 between the toothed "idler" roll 20 and the toothed driving-roll 19, driven by shaft 33, (as will be explained,) whence it passes between guide-blocks $h$ and $i$, which together constitute its guide and enters the hole in the carrier 43, which, by means already specified, is rotated to bring the passage in 43 in proper relation to receive the wire, which is then cut by the cutter 22, secured by clamp 23 upon carrier $j$, which is reciprocated by arm 24, to which it is pivoted, which arm is vibrated by its rock-shaft 25, the front or cutting end of 22 being held rigidly down to its work through a roll at the end of lever $k$, which is acted upon by spring-lever $l$, which is adjusted in its pressure upon lever $k$ by the set-screw $m$, threaded in a lug of the frame, as shown, the wire when being cut being clamped rigidly by the binding-lever $n$. The rock-shaft 25 is actuated through its rigid arm 8, which is engaged and depressed by cam 7 on driving-shaft 3, said arm being raised when released by spring $p$, Fig. 3. Shaft 33, that carries the lower feed-roll 19, is actuated through its loose arm 9, which is engaged and actuated through cam 4 on said shaft 3, the arm being raised when released by spring $q$, Fig. 4, a pawl 16, carried by arm 9 and engaged by spring 17, engaging toothed wheel 18, rigidly secured on the shaft. A ratchet 5 is secured on shaft 3 and is engaged by a pawl 34, actuated by spring 35, the function of which parts is to prevent retrograde motion of said shaft at the only point where such movement could occur.

All the parts thus far referred to, except the devices for holding cutter 22 down to its work, being fully shown and described in my said former patent, need not be further specified, they being here referred to only for the purpose of showing the relation of my present invention thereto.

For the purpose of graduating the length of the nails I employ the following devices: A shaft 11 is journaled in bearings on the oblique part D of head C. Upon the front end of said shaft is arranged a disk 26, secured rigidly to frame D, and around said disk is marked a scale 27, numbered as of the various lengths of nails to be cut. Outside said disk a lever 29 is secured rigidly on the shaft, said lever carrying a finger 28 to co-operate with the scale on disk 26. A shorter lever $s$ is pivoted at $t$ upon lever 29, and carries a locking-pin 31 to enter holes 32 in the disk, a spring 30 tending to force said pin into the holes when lever $s$ is released. Upon shaft 11 is mounted the helical spring 12, the front end of which is anchored to the shaft by screw $u$, Fig. 3, the opposite (rear) end of the spring being anchored in hub 13 of the stair-stepped cam $w$, said hub being journaled in bearing $v$ of the frame, while shaft 11 has rotary movement in the hub as its bearing. Said hub is cut away in a portion of both its lengths and circumference, as at 15, so that the radial pin 14, secured in shaft 11, has requisite movement in said seat 15. Upon the shaft 11 is loosely mounted the said cam $w$, as shown, while on arm 9 is pivoted the forked bar 10, the longitudinal slot in which receives shaft 11, so that the bar slides freely thereon. A stud $x$, projecting from the side of 10, is so arranged as to engage the teeth or steps of cam $w$. As each step in cam $w$ from that in which stud $x$ is shown as seated to that at the opposite end of the cam is farther and farther from the shaft 11, it follows that as said cam is turned downward the return movement of rod 10 and arm 9, when released by cam 4, will be the sooner arrested by the engagement of stud $x$ in a step of the cam, and that therefore at the next revolution of cam 4 it will move arm 9 a less distance, as it will not so soon engage the arm when it is held thus depressed. Hence if index-finger 28 was at, say, five-eighths inch on index 27 of disk 26, Fig. 1, and it was desired to change the length of nails being cut to, say, three-eighths inch, lever $s$ would be actuated to withdraw locking-pin 31, and lever 29 would be rotated to bring finger 28 to point ⅜, by which act shaft 11 would be correspondingly rotated and proportionate force applied to spring 12, so that at the next depression of arm 9, and consequent withdrawal of stud $x$ from cam $w$, the spring would throw the cam downward as far as stud 14 permitted, so that when arm 9 again rose its movement would be arrested by the engagement of stud $x$ with a seat in the cam at such distance from shaft 11 that the next revolution of cam 4 could only move arm 9 downward so far as to rotate its shaft 33 (through the toothed wheel 18 and pawl 16) far enough to cause feed-roll 19, with its co-acting idler 20, to feed the wire $g$ forward a requisite distance, so that cutter 22 could cut the required three-eighths inch nail. When it is required to change from making a shorter to a longer nail and lever 29 is depressed, the force thereby exerted upon cam $w$ through shaft 11 and spring 12 will raise the cam at once, and arm 9 and rod 10 will by the force of spring $q$ follow the movement of the cam, and hence it is that not only can the change be made while the machine is in full operation from a longer to a shorter nail, and vice versa, but when lever 28 has been changed in either direction the succeeding nail will be of the newly-required length.

I claim as my invention—

1. In a nail-forming machine, the combination, with the wire-feeding mechanism, of lever $k$, having a roll at its end, pivoted arm $t$, arranged to act against the arm of said lever, and an adjusting-screw $m$, arranged to act against said arm, all substantially as specified.

2. The combination, with the wire-feeding mechanism, of an arm secured upon the feed-roll shaft with means to actuate the same, a rod pivoted to said arm and provided with a stop or stud, a stair-stepped cam pivotally supported and arranged with its steps in the line of said stop or stud, a shaft having a spring with one end thereof secured thereto and the other to said cam, an adjusting-lever secured upon said shaft with a locking device therefor, and an indicating mechanism, whereby the degree of adjustment may be graduated according to the length of nail required.

JOHN P. SMITH.

Witnesses:
T. W. PORTER,
FRANK M. STEVENS.